United States Patent [19]

Haag et al.

[11] 4,359,812

[45] Nov. 23, 1982

[54] METHOD OF MAKING A JOINT

[75] Inventors: Norbert P. Haag; William D. Irish, both of Louisville, Ky.

[73] Assignee: General Electric Company, Louisville, Ky.

[21] Appl. No.: 224,991

[22] Filed: Jan. 14, 1981

[51] Int. Cl.³ .......................... B23P 3/00; B23P 25/00
[52] U.S. Cl. ...................................... 29/458; 29/469.5; 29/516; 62/77; 285/177; 285/382.2
[58] Field of Search ...................... 29/516, 458, 469.5; 285/177, 382.2; 62/77

[56] References Cited

U.S. PATENT DOCUMENTS

| | | | |
|---|---|---|---|
| 2,005,969 | 6/1935 | Cornell, Jr. ......................... | 285/177 |
| 2,270,604 | 1/1942 | Roemhild ......................... | 285/177 X |
| 2,504,625 | 4/1950 | Barnhart et al. ............. | 285/382.2 X |
| 2,645,099 | 7/1953 | Cumming . | |
| 2,760,346 | 8/1956 | Grenell et al. . | |
| 2,782,496 | 2/1957 | Augustauskas ...................... | 62/77 X |
| 3,068,563 | 12/1962 | Reverman .............................. | 29/458 |
| 3,343,252 | 9/1967 | Reesor ................... | 29/458 |
| 3,690,703 | 9/1972 | Philipps ............................ | 285/177 |
| 3,822,464 | 7/1974 | Hester et al. ................. | 285/382.2 X |
| 4,330,924 | 5/1980 | Kushner et al. ............. | 285/382.2 X |

FOREIGN PATENT DOCUMENTS 1239754 7/1971 United Kingdom ............. 285/382.2

Primary Examiner—Charlie T. Moon
Attorney, Agent, or Firm—Frederick P. Weidner; Radford M. Reams

[57] ABSTRACT

A method for making a joint between a small diameter metal tube and a large diameter metal tube by coating the outside of the small diameter tube with an adhesive and inserting it through a hollow cylindrical sleeve made of metal having the same or greater thermal coefficient of expansion as a small diameter tube such that it extends beyond the ends of the hollow sleeve. An area of the hollow sleeve is deformed circumferentially to displace the adhesive in the deformed area and make metal-to-metal contact between the sleeve and the small diameter tube. A portion of the sleeve is coated with adhesive and one of the sleeve or large diameter tube is positioned around the other with said one having a thermal coefficient of expansion the same or greater than the other and then deforming an area of said one of the sleeve or large diameter tube circumferentially to displace the adhesive in the deformed area and make metal-to-metal contact between the large diameter tube and the sleeve.

8 Claims, 9 Drawing Figures

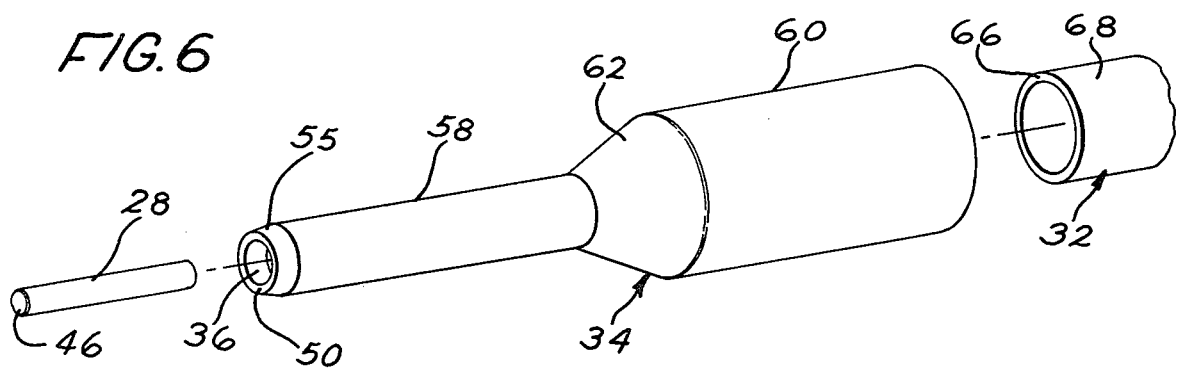
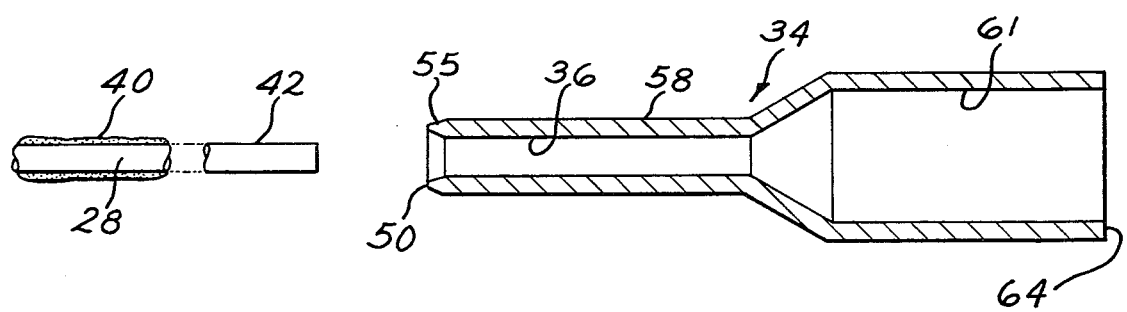
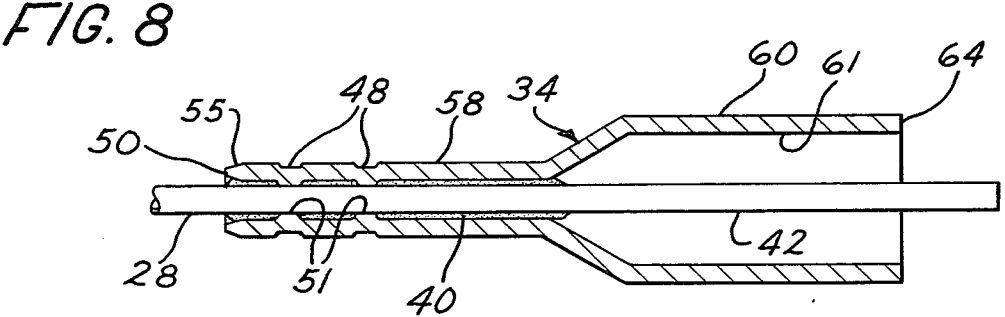
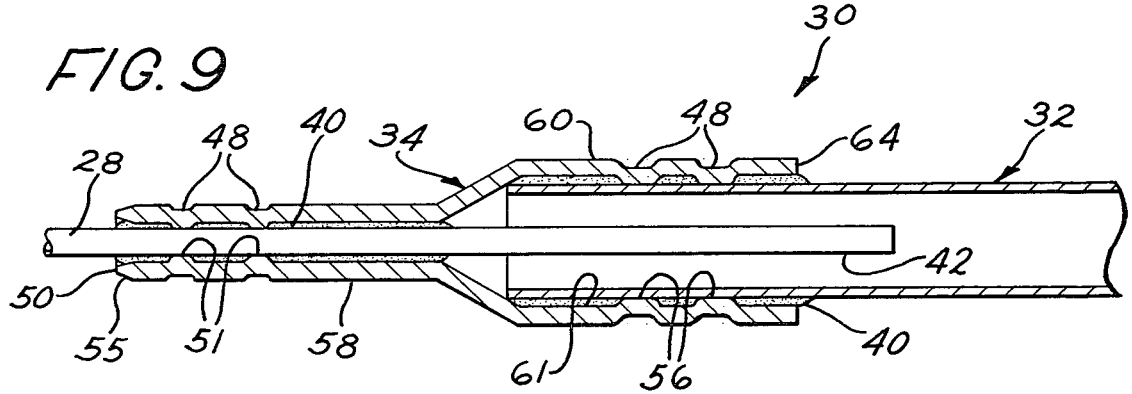

4,359,812

METHOD OF MAKING A JOINT

BACKGROUND OF THE INVENTION

This invention relates to a method of making a joint between a small diameter metal tube and a large diameter metal tube and particularly when the tubes are of dissimilar metals. More particularly, this invention relates to making a joint between a capillary tube and an evaporator or condenser tube of a refrigerating system.

Joining of the capillary tube to either the evaporator tube or condenser tube which are considerably larger in diameter than the capillary tube has been done by using a intermediate cylindrical sleeve and then silver-soldering the components together. By so soldering, mechanical strength of the joint is achieved and also there is electrical continuity from the capillary tube through the sleeve to the evaporator or condenser tube for grounding purposes in accordance with various safety codes to prevent electrical shock hazard. Silver-soldering of the capillary to the evaporator or condenser tube has certain drawbacks, one of which is that the heat necessary to achieve the soldering operation can collapse the very small diameter capillary tube and thus make it inoperative in the refrigerating system. Silver-soldering is also an expensive operation both as the equipment and the materials involved.

By this invention, there is provided a method of making a joint between a small diameter tube and a large diameter tube such as between a capillary tube and a evaporator or condenser tube and that joint is made with adhesive and is mechanically strong and also has electrical continuity for grounding the joined tubes.

SUMMARY OF THE INVENTION

According to one aspect of this invention, there is a method of making a joint between a small diameter metal tube and a large diameter metal tube by coating the outside of the small diameter tube with an adhesive and inserting the coated small diameter tube through a hollow cylindrical sleeve made of metal having the same or greater thermal coefficient of expansion as the small diameter tube and extending beyond the ends of the hollow sleeve. An area of the hollow sleeve is deformed circumferentially to displace the adhesive in the deformed area and make metal-to-metal contact between the sleeve and the small diameter tube. At least a portion of the sleeve is coated with an adhesive and one of the sleeve or large diameter tube is positioned around the other with said one having a thermal coefficient of expansion the same or greater than the other. An area of said one of the sleeve or large diameter tube is deformed circumferentially to displace the adhesive in the deformed area and make metal-to-metal contact between the large diameter tube and the sleeve. By this method of joining a small diameter tube to a large diameter tube, the joint is mechanically strong and has electrical continuity for grounding purposes.

BRIEF DESCRIPTION OF THE DRAWINGS

FIG. 6 is an exploded perspective view of some of the component parts of a joint made in accordance with the present invention showing an alternate embodiment.

FIG. 7 shows some of the component parts in one step of making an alternate embodiment of a joint made in accordance with the present invention.

FIG. 8 shows some of the component parts in another step of making an alternate embodiment of a joint made in accordance with the present invention.

FIG. 9 shows the final joint assembly of an alternate embodiment made in accordance with the present invention.

DESCRIPTION OF THE PREFERRED EMBODIMENT

Figure 1:
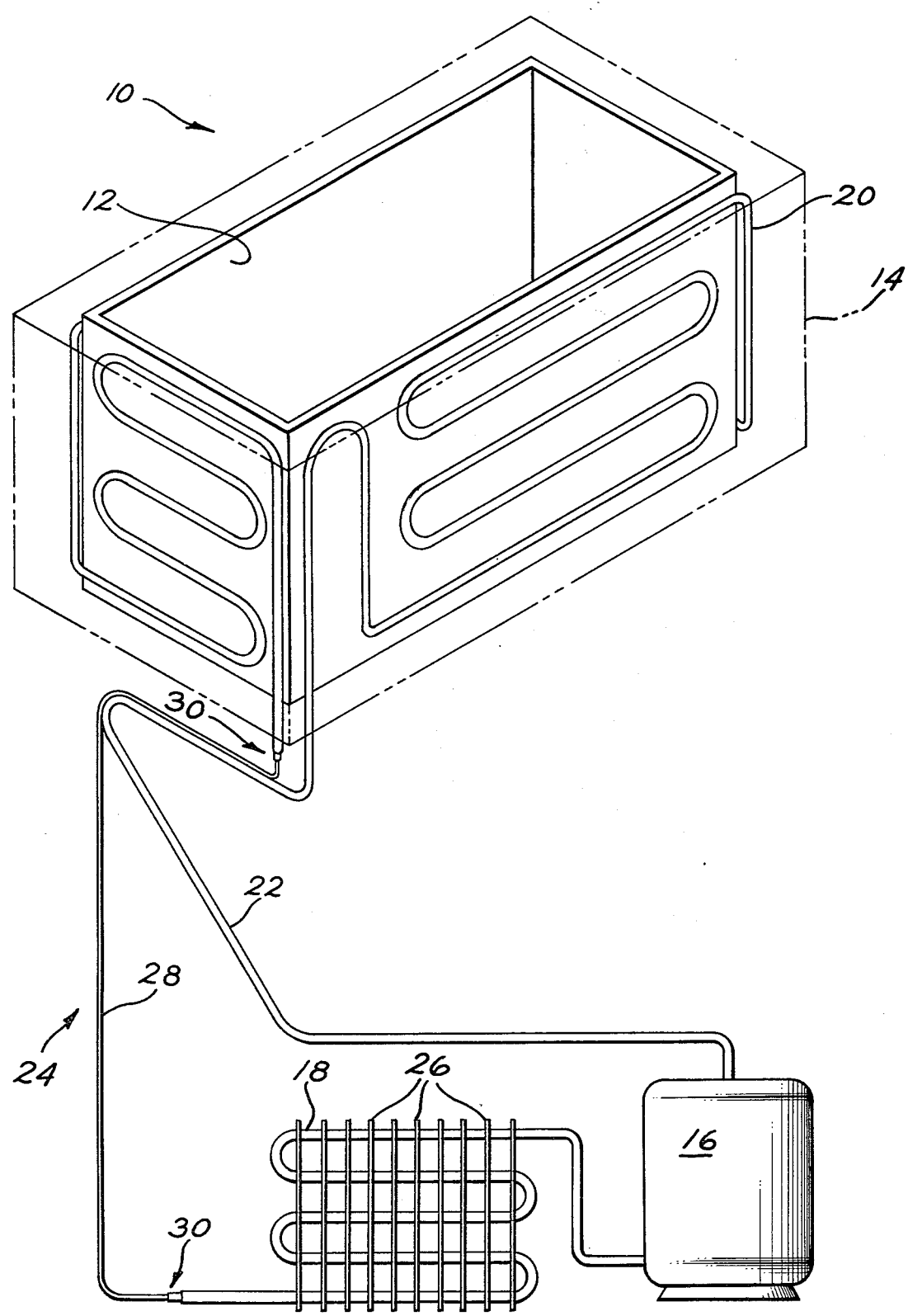
FIG. 1 is a diagramatic elevational view of a refrigerating system utilizing a capillary tube assembly and having a joint made in accordance with the present invention.

With reference to FIG. 1, the numeral 10 designates a cabinet or compartment to be refrigerated in which for purposes of illustration may comprise an inner lining 12 and insulating material 14 surrounding the liner 12. The refrigerating apparatus disclosed is of a conventional type and includes a motor and compressor unit 16, a condenser 18, and an evaporator 20 which comprises serpentine coils surrounding the compartment to be refrigerated. A suction line 22 is arranged between the evaporator 20 and the compressor 16 for conducting gasified refrigerant from the evaporator to the compressor, and a capillary tube assembly indicated generally at 24 is provided for conducting liquified refrigerant from the condenser to the evaporator.

In a refrigerating apparatus of the type disclosed, the compressor 16 pumps the gasified refrigerant through the suction line 22 into the compressor which compresses the gas and discharges the same into the serpentine coils of the condenser 18. The refrigerant gas is discharged from the compressor at a high pressure and consequently at a relatively high temperature. The high temperature gas loses its heat to the air while passing through the condenser 18 by means of the heat radiating fins 26. The result of the withdrawal of heat from the gas by means of the condenser is that the gas is thereby converted into liquid refrigerant. The liquid refrigerant then passes through the capillary tube assembly 24 and into the evaporator 20. The refrigerant will evaporate in the evaporator 20 and heat is absorbed from the compartment 10 by the refrigerant. As soon as the temperature of the compartment 10 is reduced to a predetermined level, suitable temperature responsive controls (not shown) will function to break the motor circuit and stop the compressor. After the refrigerant in the evaporator has ceased to absorb heat from the compartment 10, the temperature of the compartment will rise until a predetermined temperature level is reached at which time the controls will close the motor circuit and start the compressor so as to begin the refrigerating cycle again.

The capillary tube 28 is provided for conducting the liquid refrigerant from the condenser to the evaporator, and such capillary tube is provided with a length and a bore of a size sufficient to permit the proper amount of such refrigerant to flow into the evaporator under the normal differences in pressure in the system. The capillary tube 28 is a small diameter tube and must be joined to the larger diameter tubes of the condenser 18 and the evaporator 20. These joints are designated 30 in FIG. 1.

Figure 2:
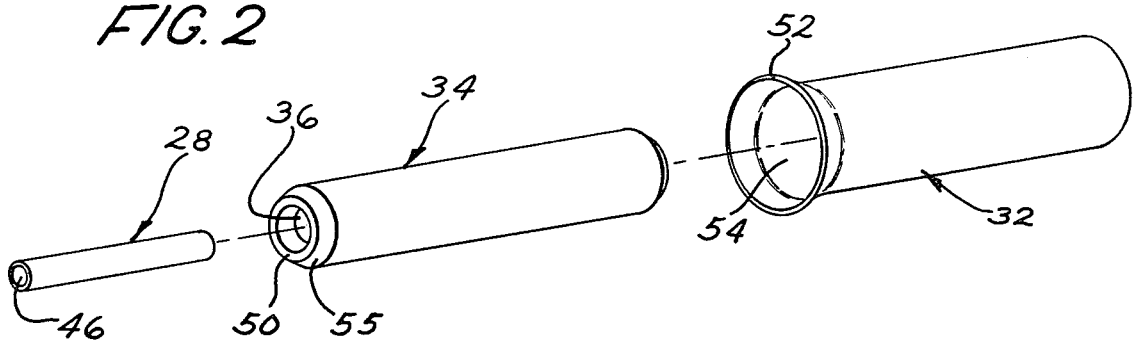
FIG. 2 is an exploded prospective view showing some of the component parts of a joint mode in accordance with the present invention.
Figure 3:
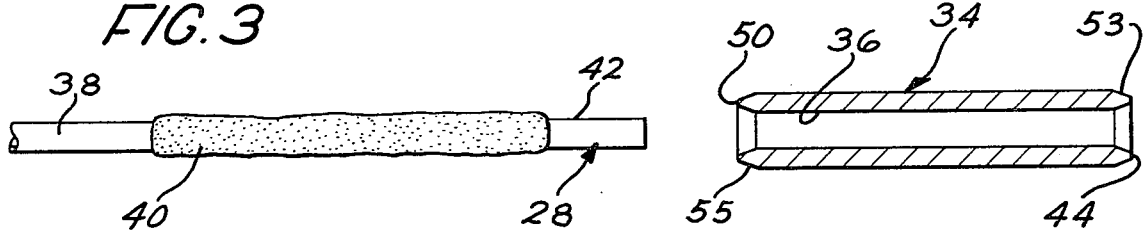
FIG. 3 shows some of the component parts in one step of making a joint in accordance with the present invention.
Figure 4:
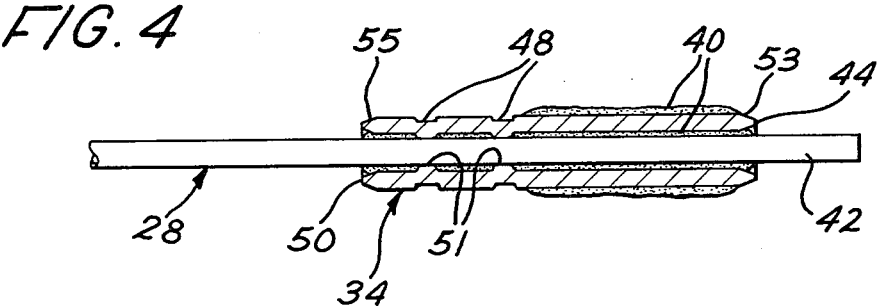
FIG. 4 shows some of the component parts in another step of making a joint in accordance with the present invention.

With reference to FIGS. 2-5, the method of making a joint in accordance with the present invention will now be described. As shown in FIG. 2, a capillary tube 28 which may be made of copper and has a small diameter with a very small bore 46, is to be joined to a large diameter tube 32 with a large bore 54 which can be for instance wither an aluminum condenser tube or evaporator tube. An intermediate hollow cylindrical sleeve 34 which may be made of aluminum, is provided and has an internal bore 36 of a diameter slightly larger than the outside diameter of the capillary tube 28. The outside diameter of the cylindrical sleeve 34 is slightly smaller than the diameter of the internal bore 36 of the large diameter tube 32. A portion of the outside surface 38 of the capillary tube 28 is coated with an adhesive material 40 and that portion is generally a distance equal to the length of the cylindrical sleeve 34. The forward end portion 42 of the capillary tube 28 is not coated with the adhesive to insure that the adhesive does not plug up the bore 46. The adhesive coated capillary tube 28 is inserted through the hollow cylindrical sleeve 34 far enough so that the end portion 42 of the capillary tube 28 extends beyond the end 44 of the sleeve 34. As shown in FIG. 4, the capillary tube 28 extends beyond the ends 44 and 50 of the hollow cylindrical sleeve 34. The adhesive 40 may be any suitable rigid adhesive end preferably a one component thixotropic epoxy adhesive which is thermosetting. We have, for instance, found an adhesive sold by Amicon Corporation under the tradename "Uniset" to be quite satisfactory for the purposes intended.

As shown in FIG. 4, a circumferential area 48 toward the end 50 of the sleeve 34 is deformed and preferably two such spaced apart areas are deformed. The hollow sleeve is circumferentially deformed in the area 48 sufficiently to displace the adhesive in the deformed area and make metal-to-metal contact 51 between the sleeve 34 and the small diameter capillary tube 28. The deformed area 48 provides for mechanical strength between the sleeve 34 and capillary tube 28 and also electrical continuity between the two for grounding purposes.

Figure 5:
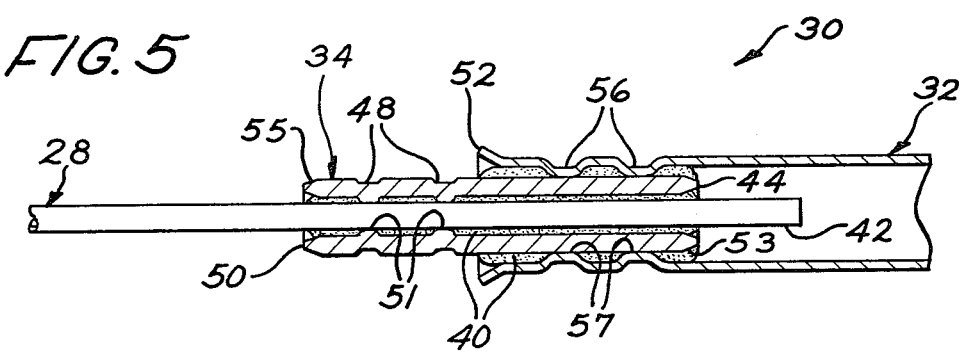
FIG. 5 shows the final joint assembly made in accordance with the present invention.

The sleeve 34 has its outside surface toward the end 44 away from the deformed area 48 coated with adhesive 40, as shown in FIG. 4, and that sub-assembly is positioned or inserted into the bore 54 of the large diameter tube 32. To help accommodate the insertion operation, the large diameter tube 32 has a flare portion 52 and the ends 44 and 50 of the sleeve 34 have a chamfor 53 and 55, respectively, to help guide the sleeve 34 into the bore 54. The sub-assembly of the capillary tube 28 and sleeve 34 and adhesive 40 are inserted into the large diameter tube 32 a distance about half the length of sleeve 34 so that the deformed area 48 remains outside the large diameter tube 32. The large diameter tube is circumferentially deformed in an area 56 and preferably in two such spaced apart areas as shown in FIG. 5. The deformation is sufficient to displace the adhesive 40 in the deformed area 56 and make metal-to-metal contact 57 between the large diameter tube 32 and the sleeve 34. The final joint assembly 30 is shown in FIG. 5. The joint 30 shown in FIGS. 2-5 is one wherein the cylindrical sleeve 34 and the large diameter tube 32 are made of metal having the same thermal coefficients of expansion. For example, the sleeve 34 and large diameter tube 32 may both be made of aluminum. If, however, the metal, such as aluminum, of the cylindrical sleeve 34 has a higher thermal coefficient of expansion than the metal, such as steel, of the large diameter tube 32, then the large diameter tube 32 should be located inside the sleeve 34 as will be explained in connection with FIGS. 6-9.

As can be seen in FIGS. 6-9, the cylindrical sleeve 34 has a first smaller diameter portion 58 and a second larger diameter portion 60 interconnected by a cone-shaped transitional portion 62. The first smaller diameter portion 58 is very similar to the cylindrical sleeve 34 shown in FIGS. 2-5 and its elements are similarly identified by number. The capillary tube 28 is secured in the smaller diameter portion 58 in the same manner as described in connection with the method of making the joint shown in FIGS. 2-4. It will be noted, however, that the end portion 42 of the capillary tube that is not coated with adhesive 40 is considerably longer so that it will extend beyond the end 64 of the second larger diameter portion 60 of the sleeve 34. In this regard, see in particular FIG. 8.

The inside diameter of the second larger diameter portion 60 of the cylindrical sleeve 34 is slightly larger than the outside diameter of the large diameter tube 32. It will also be noted that the end 66 is not flared as was in the case with the large diameter tube shown in FIGS. 2-5. This is so the large diameter tube 32 can be positioned in the second larger diameter portion 60 of the sleeve 34.

In the method of making the joint shown in FIGS. 6-9, the capillary tube 28, other than the end portion 42, is coated with adhesive 40 and inserted into the first smaller diameter portion 58 of the sleeve 34 so that the capillary tube end portion 42 will protrude through the first smaller diameter portion 58 and the end 64 of the sleeve 34. The first small diameter portion 58 of the sleeve is then deformed and preferably in two areas 48 again for the purpose of displacing the adhesive 40 in the deformed area and make metal-to-metal contact 51 between the sleeve 34 and the capillary tube 28. The outside surface 68 of the large diameter tube 32 is then coated with adhesive 40 and inserted into the bore 61 of the second larger diameter portion 60 of the sleeve 34 preferrably a distance to allow the end 66 of the large diameter tube to abutt the inside surface 63 of the interconnecting cone-shaped portion 62. The second larger diameter portion 60 is then deformed in an area 48, and preferably at least two spaced apart areas, circumferentially to displace the adhesive 40 in the deformed area and make metal-to-metal contact 56 between the second larger diameter portion 60 of the sleeve 34 and the large diameter tube 32. The deformed area 48 is again provided for the purpose of mechanical strength to the joint and also to provide electrical continuity through the joint 30 to provide for a ground.

In the preferred process of the invention of making the joint 30, the adhesive used is a thermal-set type and after the completion of the assembly of the joint 30 as shown in FIGS. 5 and 9, the joint is then subjected to elevated temperatures for a sufficient length of time to cure the adhesive and firmly bond the capillary tube 28, sleeve 34 and large diameter tube 32 together.

While the preferred process of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method of making a joint between a small diameter metal tube and a large diameter metal tube comprising the steps of:
    coating the outside of the small diameter tube with an adhesive;
    inserting the coated small diameter tube through a hollow cylindrical sleeve made of metal having the same or greater thermal coefficient of expansion as the small diameter tube, and extending beyond the ends of said hollow sleeve;
    deforming an area of the hollow sleeve circumferentially to displace the adhesive in the deformed area and make metal-to-metal contact between the sleeve and the small diameter tube;
    coating at least a portion of the sleeve with an adhesive;
    positioning one of the sleeve or large diameter tube around the other with said one having a thermal coeffficient of expansion the same or greater than the other, and
    deforming an area of said one of the sleeve or large diameter tube circumferentially to displace the adhesive in the deformed area and make metal-to-metal contact between the large diameter tube and the sleeve.

2. The method of making the joint of claim 1 wherein each deforming step includes deforming at least two spaced apart areas.

3. The method of making the joint of claim 1 wherein the adhesive is thermosetting and the joint is heated to cure the adhesive.

4. The method of making the joint of claim 1 wherein the small diameter tube is made of copper, the sleeve is made of aluminum, the large diameter tube is made of aluminum and the large diameter tube is positioned around the sleeve.

5. The method of making the joint of claim 4 wherein the sleeve is coated on the outside with the adhesive prior to the positioning of the large diameter tube around the sleeve.

6. The method of making the joint of claim 1 wherein the small diameter tube is made of copper, the sleeve is made of aluminum, the large diameter tube is made of steel, and the sleeve is positioned around the large diameter tube.

7. The method of making the joint of claim 6 wherein the large diameter tube is coated on the outside with the adhesive prior to the positioning of the sleeve around the large diameter tube.

8. The method of making the joint of claim 1 wherein the small diameter tube is a capillary tube for conducting refrigerant from a condenser to an evaporator in refrigerating apparatus and the large diameter tube is an evaporator tube or a condenser tube.

* * * * *